US008214850B2

(12) United States Patent
Oglesby et al.

(10) Patent No.: US 8,214,850 B2
(45) Date of Patent: Jul. 3, 2012

(54) TEXT EDITOR VIRTUAL BACKING STORE

(75) Inventors: Jose M. Oglesby, Seattle, WA (US); Robert A. Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/965,001

(22) Filed: Dec. 27, 2007

(65) Prior Publication Data

US 2009/0172709 A1 Jul. 2, 2009

(51) Int. Cl.
G06F 3/00 (2006.01)
G06F 9/44 (2006.01)
G06F 9/46 (2006.01)
G06F 13/00 (2006.01)

(52) U.S. Cl. .......................................... 719/328
(58) Field of Classification Search ................... 719/328
See application file for complete search history.

(56) References Cited

U.S. PATENT DOCUMENTS

| | | | | |
|---|---|---|---|---|
| 5,526,475 | A * | 6/1996 | Razdow | 715/205 |
| 5,873,111 | A * | 2/1999 | Edberg | 715/202 |
| 5,895,476 | A | 4/1999 | Orr et al. | 707/517 |
| 5,911,070 | A | 6/1999 | Solton et al. | 395/701 |
| 2002/0143823 | A1 * | 10/2002 | Stevens | 707/523 |
| 2002/0146181 | A1 | 10/2002 | Azam et al. | 382/309 |
| 2005/0091672 | A1 | 4/2005 | Debique et al. | 719/328 |
| 2005/0216922 | A1 | 9/2005 | Mogilevsky et al. | 719/328 |
| 2006/0271494 | A1 | 11/2006 | Ito | 705/59 |

OTHER PUBLICATIONS

Paolo Bucci, "A Program Editor to Promote Reuse," 5 pgs., http://www.umes.maine.edu/~ftp/wisr/wisr7/wisr7p/proceedings/ps/bucci.ps.
"Communicate, Research, Write and Develop More Efficiently with Ace Text," Jun. 17, 2006, 1 pg., http://wwww.acetext.com/.
Paolo Bucci, "Conceptual Program Editors," 5 pgs., http://www.umes.maine.edu/~ftp/wisr/wisr8/papers/bucci/bucci.html, Retrieved Jul. 19, 2007.
Wolfgang Weck, "Inheritance Using Contracts & Object Composition," Turku Centre for Computer Science (TUCS) & Åbo Akademi, Turki, Finland, 8 pgs., http://people.es.uchicago.edu/~robby/contract-reading-list/WCOP97.ps.
"Input Method Framework Overview," 5 pgs., 2004, http://java.sun.com/j2se/1.5.0/docs/guide/imf/overview.html.
David Wheeler, "Secure Programmer: Call Components Safely," 9 pgs., Dec. 16, 2004, http://www.ibm.com/developerworks/linux/library/I-calls.html.

* cited by examiner

Primary Examiner — Andy Ho
Assistant Examiner — Timothy A Mudrick
(74) Attorney, Agent, or Firm — Merchant & Gould (57) ABSTRACT

At an interface between a text engine and a first client application, text and first client application properties associated with the text may be received from the first client application. Then the interface may map the first client application properties associated with the text to text engine properties associated with the text. Next, the interface may provide the text and the text engine properties associated with the text to the text engine. The text engine may process the text. Next, the text engine may provide the processed text and the text engine properties associated with the processed text to the interface. The interface may then map the text engine properties associated with the processed text to the first client application properties associated with the processed text. The interface may then provide the processed text and the first client application properties associated with the processed text to the first client application.

20 Claims, 5 Drawing Sheets

TEXT EDITOR VIRTUAL BACKING STORE

BACKGROUND

Computer text editing systems are composed of different kinds of modules/subsystems. Backing store subsystems handle the storing of text and text properties. Other subsystems handle other tasks such as user interaction, display, and serialization. Conventional text editing systems tightly integrate the backing store subsystem. Consequently, conventional systems do not incorporate a virtual interface over the backing store. This makes it difficult for conventional text editing subsystems to allow fine grained reuse of their subsystems.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A virtual backing store may be provided. At an interface between a text engine and a first client application, text and first client application properties associated with the text may be received from the first client application. Then the interface may map the first client application properties associated with the text to text engine properties associated with the text. Next, the interface may provide the text and the text engine properties associated with the text to the text engine. The text engine may then process the text. Next, the text engine may provide the processed text and the text engine properties associated with the processed text to the interface. The interface may then map the text engine properties associated with the processed text to the first client application properties associated with the processed text. Then the interface may provide the processed text and the first client application properties associated with the processed text to the first client application.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
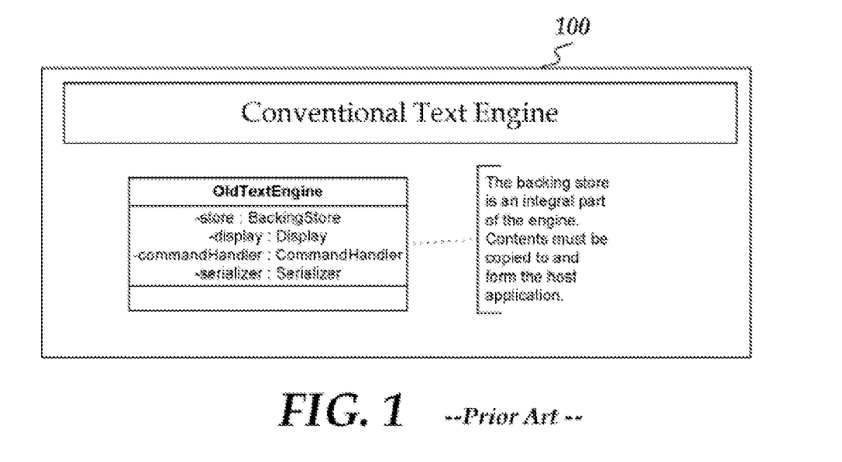
FIG. 1 is a block diagram of a conventional editing system.

Computer based text editing systems may include a backing store subsystem. Backing store subsystems may store text and text properties. Other subsystems may store data for display and serialization. A conventional text editing system 100, as illustrated in FIG. 1, tightly integrates the backing store and other subsystems. Consequently, conventional system 100 does not incorporate a virtual interface over the backing store. For example, it is not possible with conventional system 100 to create and reuse text editing components among different host applications.

Figure 2:
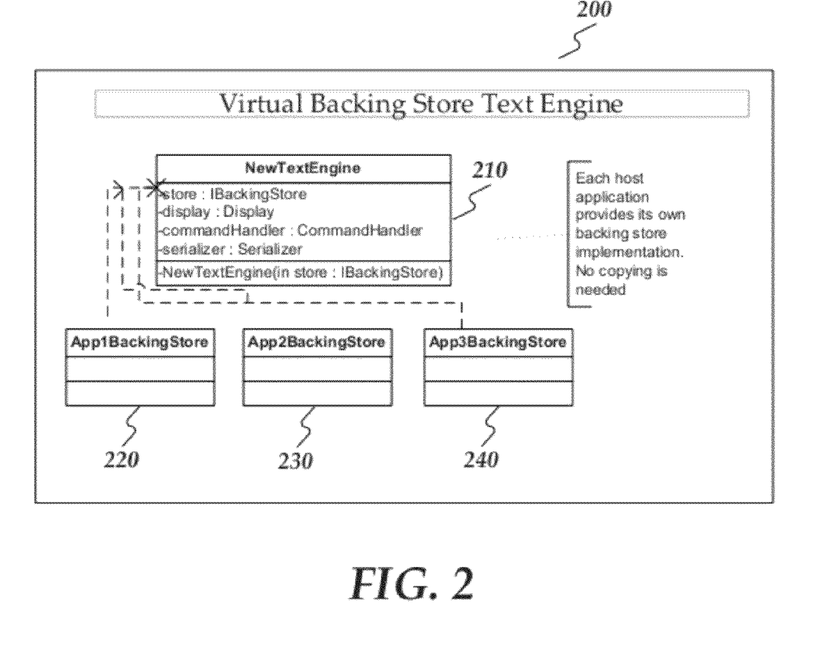
FIG. 2 is a block diagram of an operating environment for a virtual backing store.

Consistent with embodiments of the invention, FIG. 2 illustrates a virtual interface system 200 that may be incorporated over a backing store. System 200 may make it possible to create and reuse text editing components at a more granular level than with conventional systems. For example, with system 200, algorithms for navigating and editing complex text (e.g. in a text engine 210) can be reused and run against virtual backing store interface implementations in different applications (e.g. an application 220, an application 230, and an application 240.)

Figure 3:
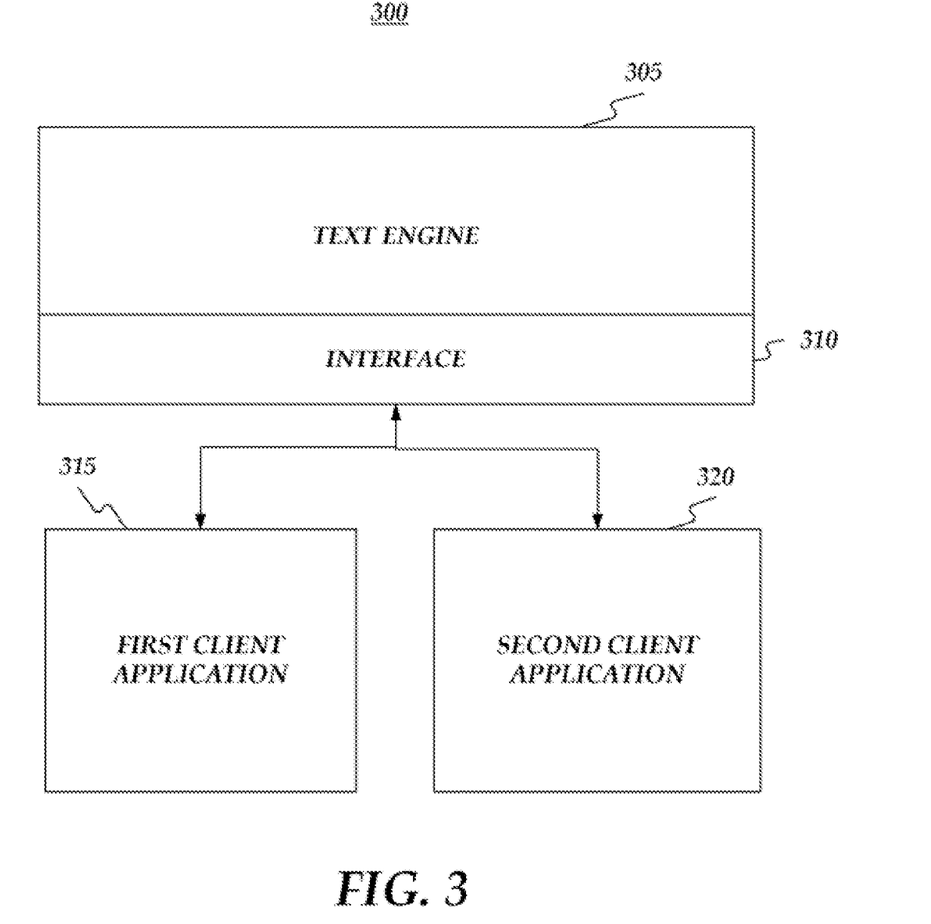
FIG. 3 is a block diagram of another operating environment for a virtual backing store.

FIG. 3 illustrates a virtual backing store system 300. Consistent with embodiments of the invention, system 300 may include a text engine 305, an interface 310, a first client application 315, and a second client application 320. Text engine 305, first client application 315, and second client application 320 may each comprise completely separate stand-alone programming modules. With system 300, a backing store may be abstracted to allow reusing other editing system parts. When implementing new editing functionality into applications, there is a cost associated with adapting the algorithms being implemented to the application's backing store data structures in conventional systems. Sometimes, this adaptation is worked around by maintaining object instances for implementing the new functionality and copying between the application and the object. Embodiments of the invention, however, eliminate inefficiencies caused by the aforementioned work-a-round.

Consistent with embodiments of the invention, first client application 315 and second client application 320 may agree on a properties set (i.e. convention) with text engine 305. This agreement may be realized in a look-up table as described in more detail below with respect to Table 1, notwithstanding, this agreement may be realized in any other appropriate associative mechanism. Furthermore, first client application 315, second client application 320, and text engine 305 may be able to maintain their own set of properties in a manner opaque to one another. Text engine 305's code may access backing stores corresponding respectively to first client application 315 and second client application 320 through interface 310.

Figure 4:
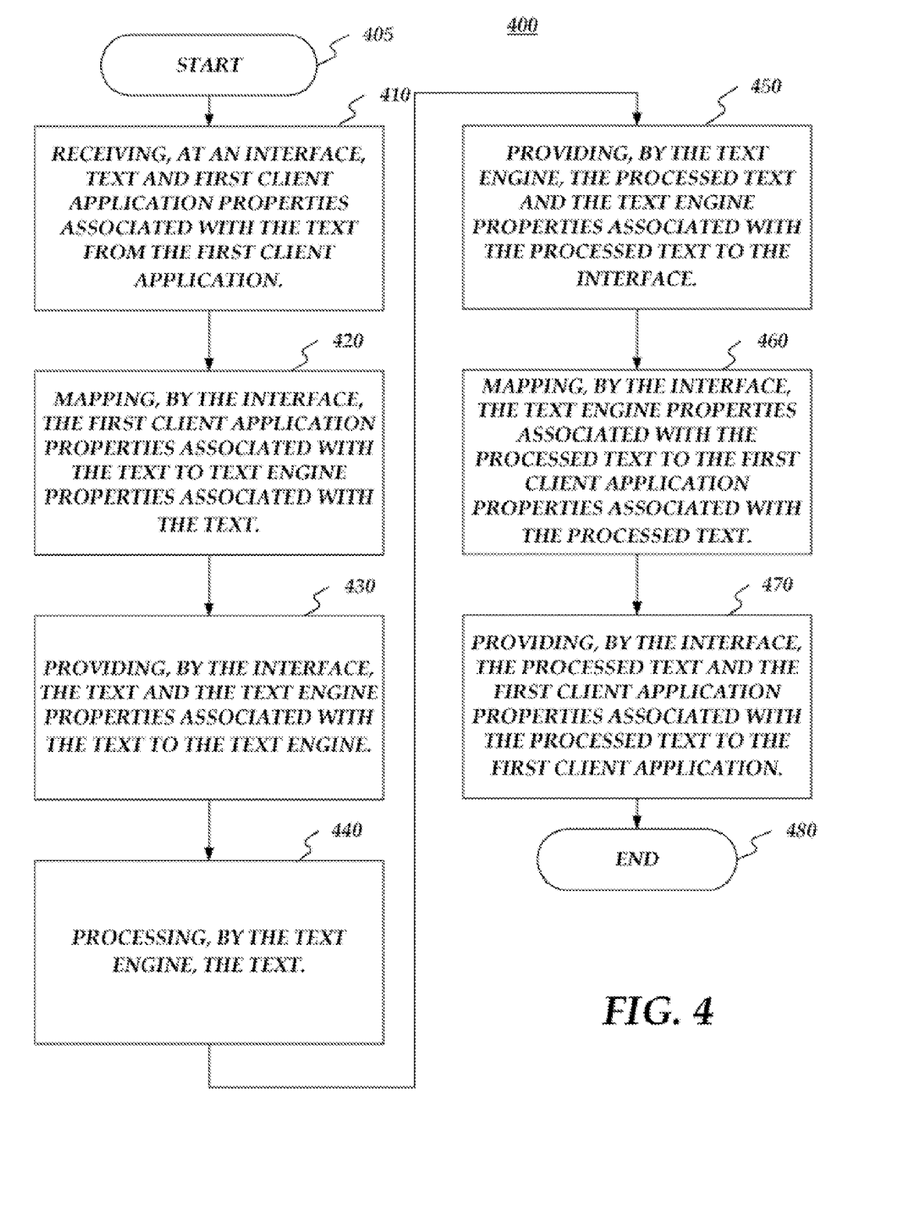
FIG. 4 is a flow chart of a method for providing a virtual backing store.

FIG. 4 is a flow chart setting forth the general stages involved in a method 400 consistent with an embodiment of the invention for providing a virtual backing store. Method 400 may be implemented using a computing device 500 as described in more detail below with respect to FIG. 5. Ways to implement the stages of method 400 will be described in greater detail below. Method 400 may begin at starting block 405 and proceed to stage 410 where computing device 500 may receive, at interface 310 between text engine 305 and first client application 315, text and first client application properties associated with the text from first client application 315. For example, first client application 315 may comprise, but is not limited to, a word processing application. Text engine 305 may comprise, but is not limited to, a text engine capable of providing text editing functionality that first client application 315 is not capable of providing. For example, the aforementioned text editing functionality may comprise editing of complicated mathematical formula and functions. Interface 310 may receive text and first client application properties associated with the text from a backing store subsystem associated with first client application 315. In this way, for example, interface 310 may go directly into first client application 315 at a very low level. The first client application properties may comprise, but are not limited to, font, color, bold, italic, alignment, inner letter spacing, and kerning.

From stage 410, where computing device 500 receives the text and first client application properties associated with the text from first client application 315, method 400 may advance to stage 420 where computing device 500 may map, using interface 310, the first client application properties associated with the text to the text engine properties associated with the text. For example, interface 310 may included a look-up table. Table 1 below is an example of such a look-up table. For example, the look-up table may include a column of encodings (e.g. column 1) that correspond to the first client application properties associated with first client application 315 and the text engine properties associated with text engine 305. The look-up table may also include a column (e.g. col. 2) for the first client application properties and another column (e.g. col. 3) for the text engine properties. In other words, look-up table may include a properties convention (e.g. col. 2) for first client application 315 and may include a properties convention (e.g. col. 3) for text engine 305.

TABLE 1

|  | Column 1 | Column 2 (First Client Application 315) | Column 3 (Text Engine 305) |
| --- | --- | --- | --- |
| Row 1 | 0110 | Italic | Bold |
| Row 2 | 0111 | Underline | Italic |
| Row 3 | 0011 | 10 pt. font | 10 pt. font |
| Row 4 | 0100 | Bold | Don't care |
| Row 5 | 1111 | Don't care | Underline |

When mapping the first client application properties associated with the text to the text engine properties associated with the text, interface 310 may receive a piece of text with the first client application properties encoding of "0111." From the look-up table, interface 310 may determine that while this encoding represents "underline" for first client application 315, it represent "italic" for text engine 305. Consequently, interface 310 may change the encoding to "1111" which corresponds to underline for text engine 305. In this way the proper property may be maintained for passing the piece of text on to text engine 305. In addition, the look-up table may contain "don't care" or default properties. The data contained in the look-up table may be agreed upon in advance between developers of first client application 315 and developers of text engine 305.

Once computing device 500 maps the first client application properties associated with the text to text engine properties associated with the text in stage 420, method 400 may continue to stage 430 where computing device 500 may provide, through interface 310, the text and the text engine properties associated with the text to text engine 305. For example, interface 310 may pass the piece of text discussed above to text engine 305. The piece of text may include the text property provided by the aforementioned mapping discussed above with respect to stage 420 in order to preserver the property originally designated by first client application 315. In other words, if the piece of text had an encoding "0111" designating it as "underline" for first client application 315, interface 310 may pass the piece of text to text engine 305 with the encoding "1111" designating it as "underline" to text engine 305.

After computing device 500 provides the text and the text engine properties associated with the text to text engine 305 in stage 430, method 400 may proceed to stage 440 where computing device 500 may process the text by text engine 305. For example, as stated above, first client application 315 may comprise, but is not limited to, a word processing application. Text engine 305 may comprise, but is not limited to, a text engine capable of providing text editing functionality that first client application 315 is not capable of providing. For example, the aforementioned text editing functionality may comprise editing of complicated mathematical formula and functions. Consistent with embodiments of the invention, first client application 315 may utilize the functional capability of text engine 305 without having to re-write first client application 315. Rather by using the virtual backing store, first client application 315 may take advantage of text engine 305's functionality. Moreover, the text engine 305 may be configured to serializing the text and displaying the text.

From stage 440, where computing device 500 processes the text by text engine 305, method 400 may advance to stage 450 where computing device 500 may provide, by text engine 305, the processed text and the text engine properties associated with the processed text to interface 310. For example, after the text is processed, text engine 305 may pass the processed text to interface 310. The text may include property encodings consistent with text engine 305's encoding convention, for example, the encoding convention in column 3 as described above with respect to Table 1.

Once computing device 500 provides the processed text and the text engine properties associated with the processed text to interface 310 in stage 450, method 400 may continue to stage 460 where computing device 500 may map, by interface 310, text engine properties associated with the processed text to the first client application properties associated with the processed text. For example, interface 310 may perform a mapping similar to the mapping described above with respect to stage 420. However, rather than mapping from first client application 315's property convention to text engine 305's property convention, in stage 460, interface 310 may do the opposite and map from text engine 305's property convention to first client application 315's property convention.

After computing device 500 maps text engine properties associated with the processed text to the first client application properties associated with the processed text in stage 460, method 400 may proceed to stage 470 where computing device 500 may provide, by interface 310, the processed text and the first client application properties associated with the processed text to first client application 315. For example, after interface 310 provides the processed text with the property convention consistent with first client application 315, interface 310 may pass the processed text along with its first client application properties to first client application 315.

Consistent with embodiments of the invention, other application such as second client application 320 may also take advantage of text engine 305's functionality in addition to first client application 315. In other words, the aforementioned stages of method 400 may be repeated for or in addition to second client application 320. In this case the look-up table referenced above may include an additional column corresponding to a properties convention for second client application 320. Once computing device 500 provides the processed text and the first client application properties associated with the processed text to first client application 315 in stage 470, method 400 may then end at stage 480.

An embodiment consistent with the invention may comprise a system for providing a virtual backing store. The system may comprise a memory storage and a processing unit coupled to the memory storage. The processing unit may be operative to receive, at an interface between a text engine and a first client application, text and first client application properties associated with the text from the first client application. The processing unit may be further operative to map, by the interface, the first client application properties associated with the text to text engine properties associated with the text. In addition, the processing unit may be operative to provide, by the interface, the text and the text engine properties associated with the text to the text engine. Furthermore, the processing unit may be operative to process, by the text engine, the text. Moreover, processing unit may be operative to provide, by the text engine, the processed text and the text engine properties associated with the processed text to the interface. In addition, processing unit may be operative to map, by the interface, the text engine properties associated with the processed text to the first client application properties associated with the processed text. Moreover, the processing unit may be operative to provide, by the interface, the processed text and the first client application properties associated with the processed text to the first client application.

Another embodiment consistent with the invention may comprise a system for providing a virtual backing store. The system may comprise a memory storage and a processing unit coupled to the memory storage. The processing unit may be operative to provide a text engine. In addition, the processing unit may be operative to provide an interface between the text engine and a client application. The interface may be configured to map client application properties associated with text to text engine properties associated with the text. The client application properties and the text engine properties may have different encodings. The interface may be further configured to map the text engine properties associated with the text processed by the text engine to the client application properties associated with the processed text.

Figure 5:
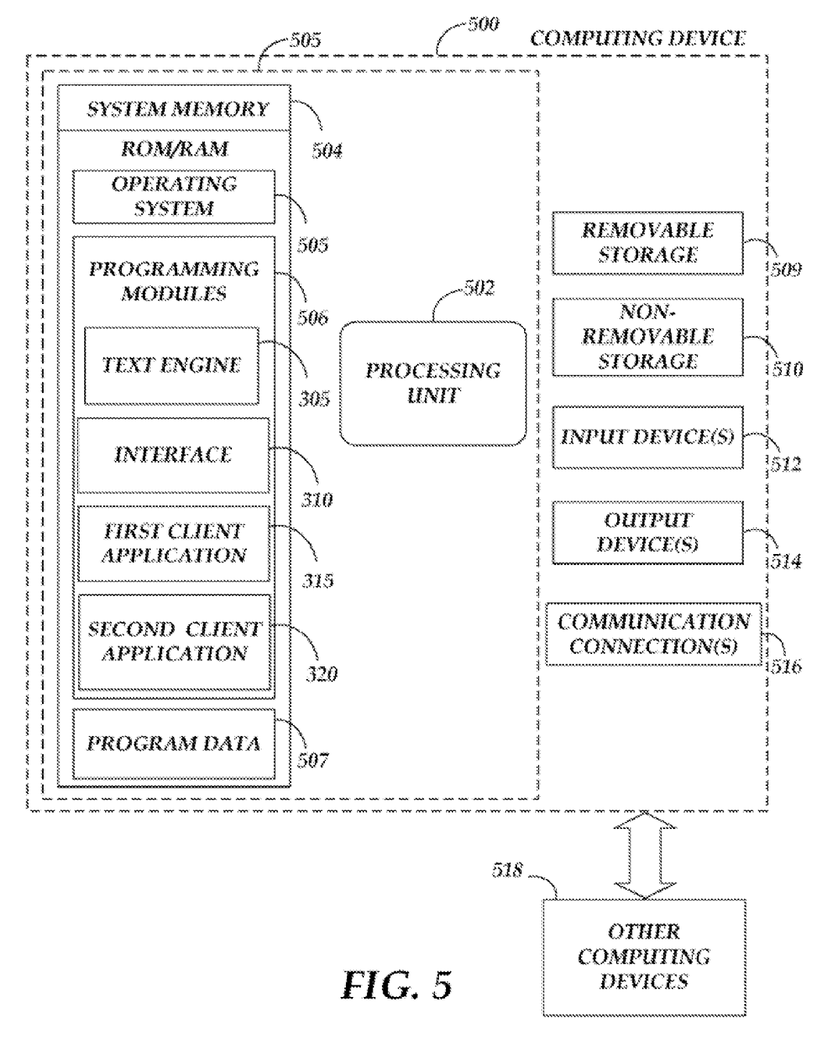
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 300 as described above. System 300 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. With embodiments of the invention, programming modules 506 may include text engine 305, interface 310, first client application 315, and second client application 320. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. text engine 305, interface 310, first client application 315, and second client application 320) may perform processes including, for example, one or more method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a virtual backing store, the method comprising:

receiving, at an interface between a text engine and a first client application executed on a computing device, text and first client application properties associated with the text from the first client application;

mapping, by the interface, the first client application properties associated with the text to text engine properties associated with the text;

providing, by the interface, the text and the text engine properties associated with the text to the text engine;

processing, by text engine, the text;

providing, by the text engine, the processed text and the text engine properties associated with the processed text to the interface;

mapping, by the interface, the text engine properties associated with the processed text to the first client application properties associated with the processed text, wherein mapping the text engine properties to the first client properties comprises referencing a look-up table establishing a properties convention between the text engine and the first client application, the look-up table comprising: property codes in a first column, the first client application properties corresponding to the property codes in a second column, and the text engine properties corresponding to the property codes in a third column; and providing, by the interface, the processed text and the first client application properties associated with the processed text to the first client application.

2. The method of claim 1, wherein receiving the text and the first client application properties associated with the text from the first client application comprises receiving the text and the first client application properties associated with the text from a backing store subsystem associated with the first client application.

3. The method of claim 1, wherein receiving the text and the first client application properties comprises receiving the first client application properties comprising at least one of the following: font, color, bold, italic, alignment, inner letter spacing, and kerning.

4. The method of claim 1, wherein receiving, at the interface between the text engine and the first client application, the text and the first client application properties comprises receiving wherein the text engine and the first client application comprise separate programming modules.

5. The method of claim 1, wherein referencing the look-up table comprises relating the first client application properties to the text engine properties.

6. The method of claim 1, wherein referencing the look-up table comprises referencing default properties for the first client application properties not having corresponding text engine properties and default properties for the text engine properties not having corresponding first client application properties.

7. The method of claim 1, wherein processing, by the text engine, the text comprises the text engine operating on a mathematical formula included in the text.

8. The method of claim 1, wherein processing, by the text engine, the text comprises the text engine configured to perform at least one of the following: serializing the text and displaying the text.

9. The method of claim 1, wherein mapping the text engine properties associated with the processed text to the first client application properties associated with the processed text comprises using a look-up table relating the first client application properties to the text engine properties.

10. The method of claim 1, further comprising:
receiving, at the interface being between the text engine and a second client application, text and second client application properties associated with the text from the second client application;
mapping, by the interface, the second client application properties associated with the text to text engine properties associated with the text;
providing, by the interface, the text and the text engine properties associated with the text to the text engine;
processing, by the text engine, the text;
providing, by the text engine, the processed text and the text engine properties associated with the processed text to the interface;
mapping, by the interface, the text engine properties associated with the processed text to the second client application properties associated with the processed text; and
providing, by the interface, the processed text and the second client application properties associated with the processed text to the second client application.

11. The method of claim 1, wherein receiving the text and the second client application properties associated with the text from the second client application comprises receiving the text and the second client application properties associated with the text from a backing store subsystem associated with the second client application.

12. The method of claim 1, wherein receiving the text and the second client application properties comprises receiving the second client application properties comprising at least one of the following: font, color, bold, italic, alignment, inner letter spacing, and kerning.

13. The method of claim 1, wherein receiving, at the interface between the text engine and the second client application, the text and the second client application properties comprises receiving wherein the text engine and the second client application comprise separate programming modules.

14. A system for providing a virtual backing store, the system comprising:
a memory storage; and
a processing unit coupled to the memory storage, wherein the processing unit is operative to:
provide a text engine; and
provide an interface between the text engine and a client application, the interface configured to map client application properties associated with text to text engine properties associated with the text, the client application properties and the text engine properties having different encodings, the interface further configured to map the text engine properties associated with the text processed by the text engine to the client application properties associated with the processed text by referencing a look-up table having the different encodings and a convention for tying the different encodings to the corresponding text engine properties and the corresponding client application properties.

15. The system of claim 14, wherein the text engine is configured to operate on a mathematical formula included in the text.

16. The system of claim 14, wherein the text engine is configured to perform at least one of the following: serializing the text and displaying the text.

17. The system of claim 14, wherein the text and the client application properties associated with the text are stored in a backing store subsystem associated with the client application.

18. The system of claim 14, wherein the client application properties comprise at least one of the following: font, color, bold, italic, alignment, inner letter spacing, and kerning.

19. The system of claim 14, wherein the text engine and the client application comprise separate programming modules.

20. A computer-readable storage medium which stores a set of instructions which when executed performs a method for providing a virtual backing store, the method executed by the set of instructions comprising:
receiving, at an interface between a text engine and a first client application, text and first client application properties associated with the text from a backing store subsystem associated with the first client application, the text engine and the first client application comprising separate programming modules;
using, by the interface, a look-up table relating the first client application properties to the text engine properties to map the first client application properties associated with the text to text engine properties associated with the text, the look-up table representing a properties encoding convention and comprising:
   a first column listing codes corresponding to the first client application properties and the text engine properties,
   a second column listing the first client application properties corresponding to the codes, and
   a third column listing the text engine properties corresponding to the codes;
providing, by the interface, the text and the text engine properties associated with the text to the text engine;
processing, by the text engine, the text;
providing, by the text engine, the processed text and the text engine properties associated with the processed text to the interface;
using, by the interface, the look-up table relating the first client application properties to the text engine properties to map the text engine properties associated with the processed text to the first client application properties associated with the processed text; and
providing, by the interface, the processed text and the first client application properties associated with the processed text to the first client application.

* * * * *